United States Patent
Sumitsuji

(12) 
(10) Patent No.: US 12,457,992 B2
(45) Date of Patent: Nov. 4, 2025

(54) FEEDING TOOL

(71) Applicant: DoggyMan H. A. Co., Ltd., Osaka (JP)

(72) Inventor: Tomoya Sumitsuji, Osaka (JP)

(73) Assignee: DOGGYMAN H. A. CO., LTD., Osaka (JP)

( * ) Notice: Subject to any disclaimer, the term of this patent is extended or adjusted under 35 U.S.C. 154(b) by 48 days.

(21) Appl. No.: 18/196,066

(22) Filed: May 11, 2023

(65) Prior Publication Data
US 2023/0389515 A1 Dec. 7, 2023

(30) Foreign Application Priority Data
Jun. 6, 2022 (JP) .................................. 2022-091405

(51) Int. Cl.
*A01K 5/01* (2006.01)
*A01K 5/02* (2006.01)

(52) U.S. Cl.
CPC .......... *A01K 5/0114* (2013.01); *A01K 5/0233* (2013.01)

(58) Field of Classification Search
CPC ........................... A01K 5/0114; A01K 5/0233; A01K 39/0125; A01K 7/02; A01K 15/02
See application file for complete search history.

(56) References Cited

U.S. PATENT DOCUMENTS

| | | | | |
|---|---|---|---|---|
| 5,676,089 A | * | 10/1997 | Morganson | A01K 39/0113 119/52.3 |
| 6,192,832 B1 | * | 2/2001 | Husnik | A01K 39/0113 119/52.3 |
| 11,234,413 B2 | * | 2/2022 | Trottier | A01K 5/0233 |
| 2017/0112092 A1 | * | 4/2017 | Simon | A01K 5/0114 |

FOREIGN PATENT DOCUMENTS

| | | | | |
|---|---|---|---|---|
| CN | 106577358 A | * | 4/2017 | |
| JP | 2021-132626 A | | 9/2021 | |
| WO | WO-9946980 A1 | * | 9/1999 | A01K 5/01 |

* cited by examiner

*Primary Examiner* — Ebony E Evans
(74) *Attorney, Agent, or Firm* — WHDA, LLP

(57) ABSTRACT

Provided is a feeding tool for pets that not only feeds pets but also provides the pets with intellectual training, exercise and entertainment. The feeding tool comprising: a drum that stores a food and has holes on its peripheral surface, a supporting portion that rotatably supports the drum, a receiving portion located below the drum, and a slider that guides the food released from the hole of the drum to the receiving portion; and the food released from the hole as the drum rotates comes into contact with the slider and is guided to the receiving portion.

5 Claims, 7 Drawing Sheets

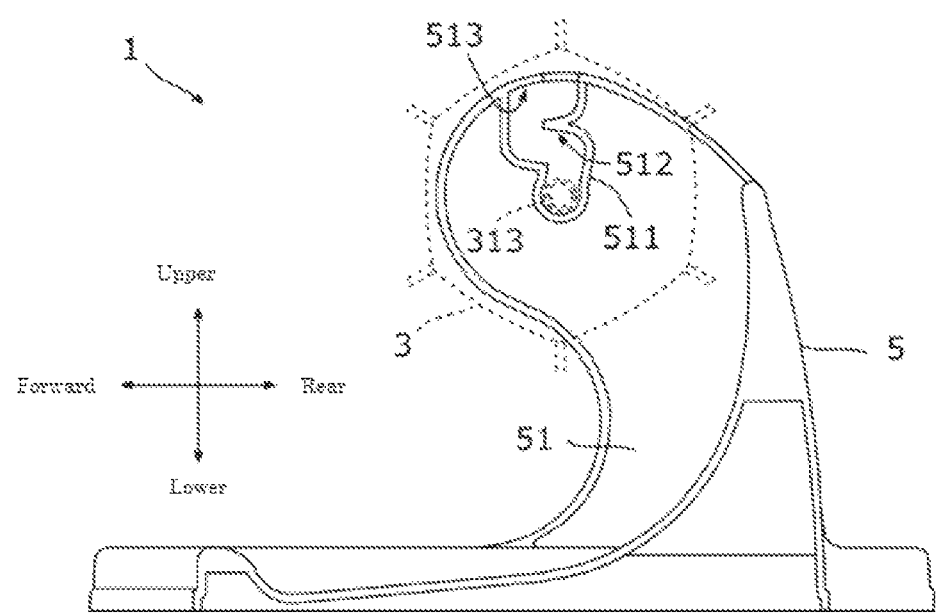

FEEDING TOOL

FIELD OF THE INVENTION

The present invention relates to a feeding tool for feeding dry foods to pets.

BACKGROUND ART

For example, Patent Literature 1 (Japanese Paten Laid-Open Application 2021-132626) discloses a feeding device which sets a supply speed of pet, food on a food supply device so that eating speed of a pet which is calculated from an amount of the pet food measured by a weight scale does not exceed a predetermined speed.

PRIOR ARTS

Patent Literature

Patent Literature 1: Japanese Patent Laid-Open Application 2021-132626

SUMMARY OF THE INVENTION

Problems to be Solved by the Invention

The pets simply wait for food in front of the feeding device of Patent Literature 1, and does not need to think or move its body to get food. Also, the feeding device of Patent Literature 1 does not provide any entertainment for the pets.

According to an aspect of the present invention, it is possible to provide a feeding tool for pets that not only feeds pets but also provides the pets with intellectual training, exercise and entertainment.

Means for Solving the Problems

In order to solve the above problems, the present invention can provide a feeding tool which comprises
  a drum that stores a food and has holes on its peripheral surface,
  a supporting portion that rotatably supports the drum,
  a receiving portion located below the drum, and
  a slider that guides the food released from the hole of the drum to the receiving portion;
  wherein the food released from the hole as the drum rotates comes into contact with the slider and is guided to the receiving portion.

According to the feeding tool of the present invention, it is preferable that the drum has a catching portion that guides the food to the hole.

According to the feeding tool of the present invention, it is preferable that the catching portion includes a catching piece that protrudes inward from a portion of the inner edge of the hole.

According to the feeding tool of the present invention, it is preferable that the drum has wings that protrude outward from the peripheral surface.

According to the feeding tool of the present invention, it is preferable that the wings are notched at positions corresponding to the holes in the circumferential direction of the drum.

According to the feeding tool of the present invention, it is preferable that further comprises an overturn prevention portion that protrudes outward along the installation surface from the base of the supporting portion.

According to the feeding tool of the present invention, it is preferable that, in the receiving portion, the front edge which faces the drum is recessed toward the drum.

According to the feeding tool of the present invention, it is preferable that the receiving portion has a raised portion which rises from the edge of the receiving portion.

Effects of the Invention

According to the present invention, the pets have to move their legs to get the food or do trial and error. In addition, the pets can enjoy how the drum rotates and how the food comes out of the drum. Furthermore, the pets have to wait until the food comes out of the drum, which leads to the deterrence of fast eating. Accordingly, the present invention can provide a feeding tool that not only feeds pets but also provides them with intellectual training, exercise and entertainment.

BRIEF EXPLANATION OF DRAWINGS

FIG. 3 is a diagram showing the positional relationship between the supporting portion 51 of the stand 5 and the shaft 313 of the drum 3.

PREFERRED EMBODIMENTS

In the following, the feeding tool according to the typical embodiments of the present invention are explained in detail by referring the drawings. However, the present invention is not limited to these drawings, and can include various modifications within the scope of the present invention. Since the drawings are to use for explaining the present invention conceptually, for showing the present invention clearly, there is a case where sizes, ratios or number may be shown in the exaggerated or simplified manner, as occasion demand.

1. Configuration of the Feeding Tool

The feeding tool 1 is used to give food F to pets, especially cats. Cat food such as granular or pellet-shaped dry food is assumed as the feed F, and the particle size is not limited as long as it can be released from the hole 311 of the drum 3. Conversely said, the size of the food F should be selected according to the size of the pet, and the size of the hole 311 should be selected according to the size of the food F.

Figure 1A:
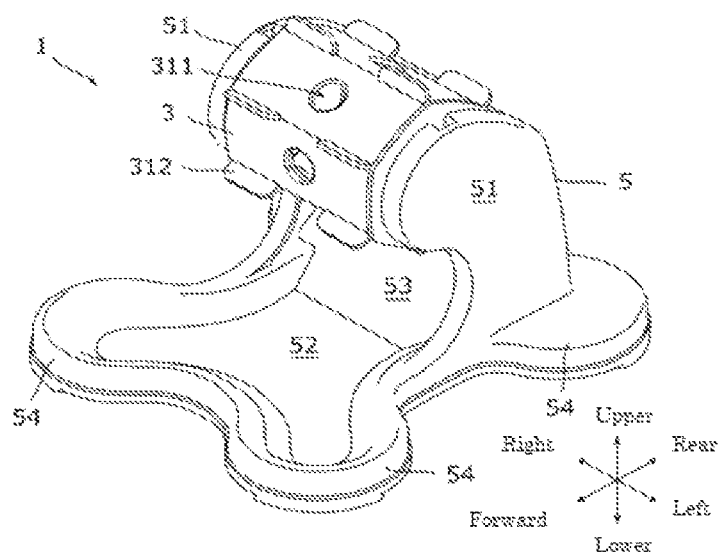
FIGS. 1(A) and 1(B) are a front perspective view and a rear perspective view of the feeding tool 1 respectively, according to an embodiment of the present invention.
Figure 1B:
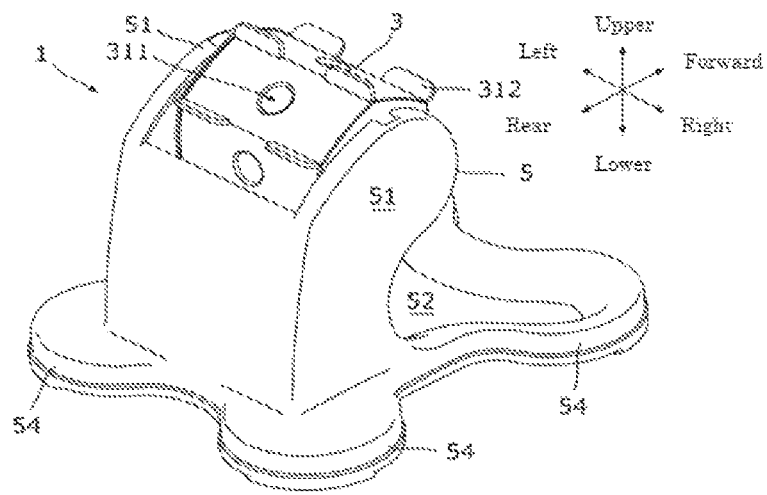

For example, as shown in FIGS. 1(A) and (B), the feeding tool 1 is mainly composed of two parts, a drum 3 and a stand 5. Each component will be described in detail below.

The drum 3 stores the food F. The drum 3 is, for example, a hollow cylinder, a spindle, or a sphere, and rotates around a rotation axis (shafts 313, 331). The drum 3 releases the food F in the drum 3 as it rotates in a predetermined direction (forward rotation direction: here, the direction of the arrow in FIG. 5(A)).

The drum 3 includes a main body 31, a catching portion 32 mounted within the main body 31, and a lid 33 closing an open end 315 of the main body 31.

The main body 31 has a hole 311 on its peripheral surface. Although at least one hole 311 is sufficient, in this embodiment, a plurality of holes 311 with different diameters are provided, so that the size of the food F released from the main body 31 can be adjusted. For example, by providing six holes 311 with different diameters ranging from 10 mm to 15 mm, the hole 311 to be used can be selected according to the size of the food F given to the pet.

The main body 31 has plate-shaped wings 312 protruding outward from the peripheral surface. The wings 312 facilitate rotation of the drum 3 by the pet. The corners of the wings 312 are rounded.

The wings 312 are provided over both ends of the main body 31, but are notched at positions corresponding to the holes 311 in the circumferential direction (side surface) of the drum 3 (main body 31). Namely, the wings 312 are not provided in the center in the axial direction in the side connecting the side surfaces of the main body 31, but are separated on both end sides. As a result, the food F released from the hole 311 is prevented from being repelled by the wing 312 and leaking from the receiving portion 52.

Figure 5A:
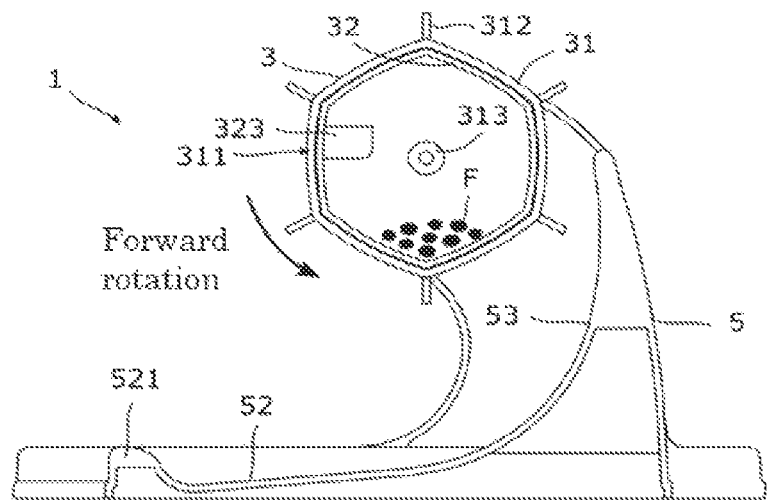
FIGS. 5(A) and 5(B) show diagrammatically how the food F is released from the drum 3 as the drum 3 rotates.
Figure 5B:
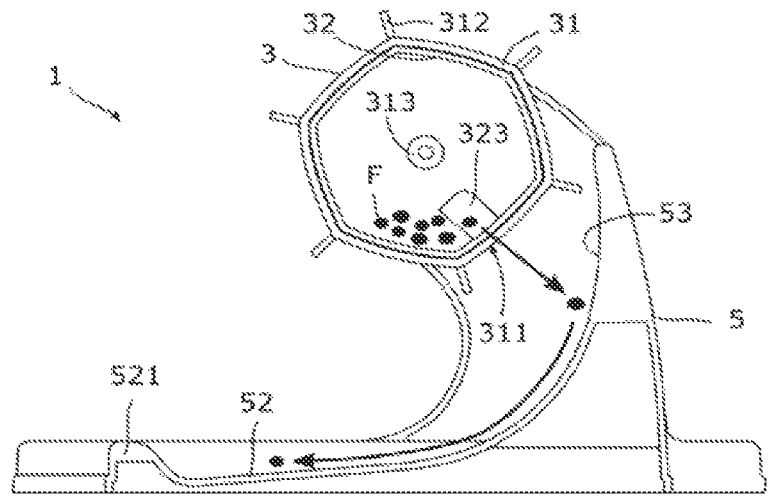

One end of the main body 31 is closed, and a shaft 313 protrudes from its center (see FIGS. 5(A) and 5(B), for example). The shaft 313 and the shaft 331 protruding from the lid 33 form a rotation shaft virtually extending substantially in the longitudinal direction of the drum 3.

The catching portion 32 guides the food F coming along the inner surface of the drum 3 from the direction opposite to the forward rotation direction of the drum 3 (in front of the hole 311 with respect to the forward rotation direction) to the hole 311 (see FIGS. 5(A) and 5(B)). The catching portion 32 has a substantially tubular shape as a whole and has an opening 321 at a position corresponding to the hole 311 of the main body 31 (see FIG. 2). At least one opening 321 is provided.

The catching portion 32 has a plurality of protruding pieces 324 protruding from one edge, and there are notch-like portions between adjacent protruding pieces 324. The role of the projecting piece 324 will be described later.

Figure 6A:
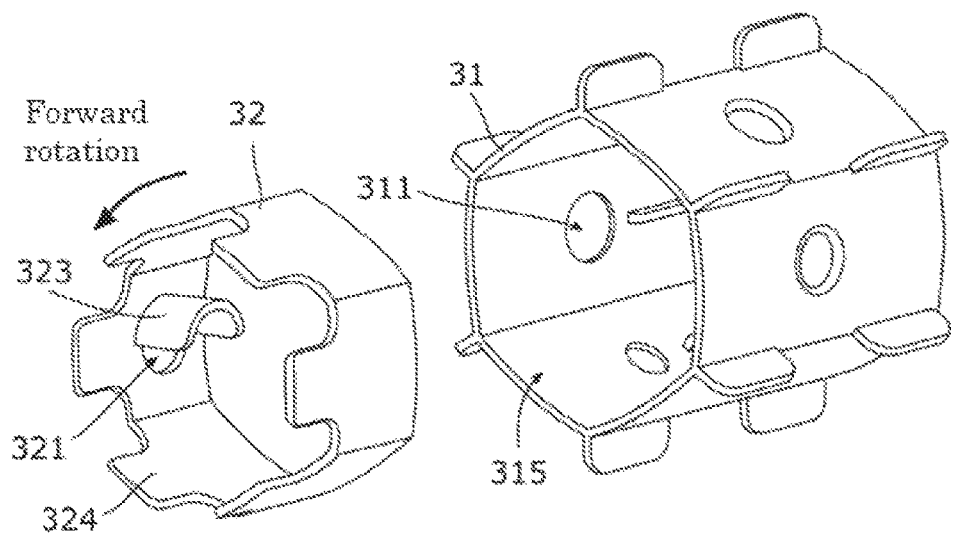
FIGS. 6(A) and 6(B) show diagrammatically a state in which the catching portion 32 is removed from the main body 31 of the drum 3 and a state in which the catching portion 32 is attached to the main body 31, respectively.

A catching piece 323 protrudes inward from the rear side of the forward rotation direction in the inner edge of the opening 321 (see FIGS. 6(A) and (B)). That is, the catching piece 323 has a concave (curved) surface facing the opening 321 side. Therefore, when the drum 3 rotates in the forward direction, the catching piece 323 catches the food F coming along the inner surface of the drum 3 with the concave surface, and guides the food F from the opening 321 to the hole 311 of the main body 31 (see FIG. 5(B)).

Figure 7A:
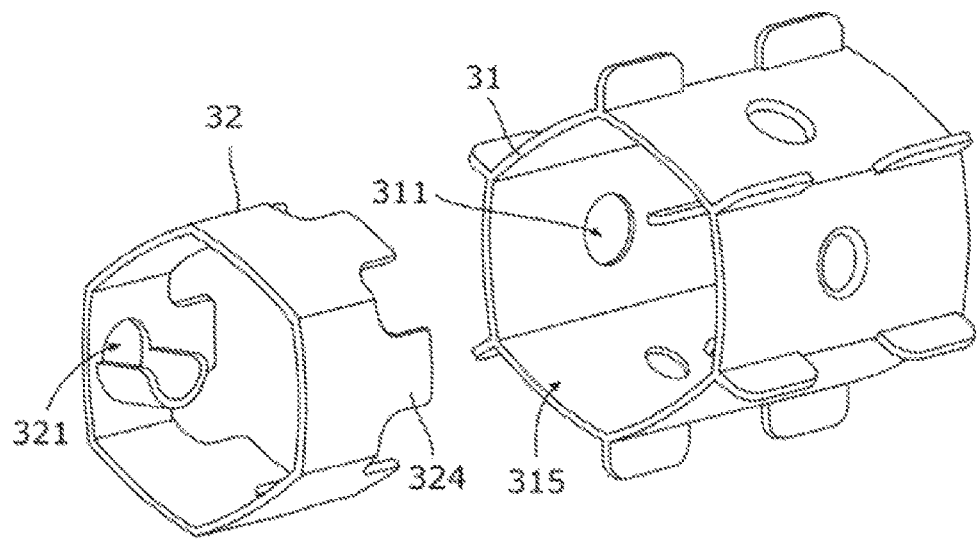
FIGS. 7(A) and 7(B) show diagrammatically a state in which the catching portion 32 is removed from the main body 31 of the drum 3 and a state in which the catching portion 32 is attached to the main body 31, respectively, in the opposite direction to FIG. 6.
Figure 7B:
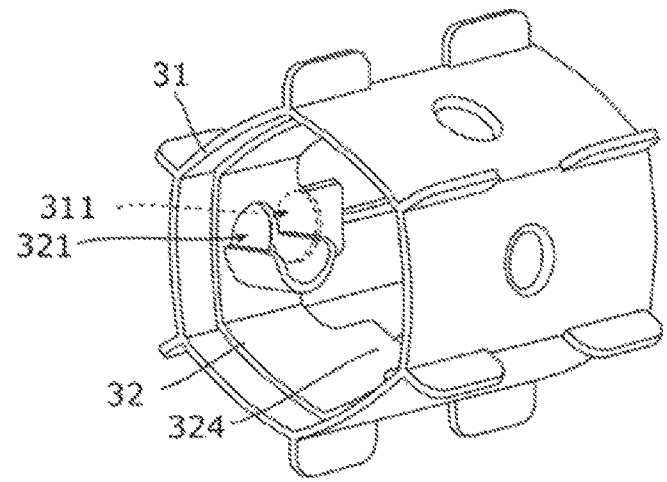

If the catching portion 32 is mounted in the main body 31 in the opposite direction, the hole 311 of the main body 31 is blocked by the catching portion 32, and the food F does not come out of the drum 3 in both the forward and reverse rotation directions (see FIG. 7(B)).

The drum 3 is preferably made of a transparent resin material. This allows the pet to visually recognize the food F in the drum 3. Therefore, when the pet is hungry, the pet tries to take out the food F in the drum 3 or enjoys the movement of the food F in the rotating drum 3, thereby enhancing the interest in the feeding tool 1.

Next, the stand 5 will be explained.

Figure 2:
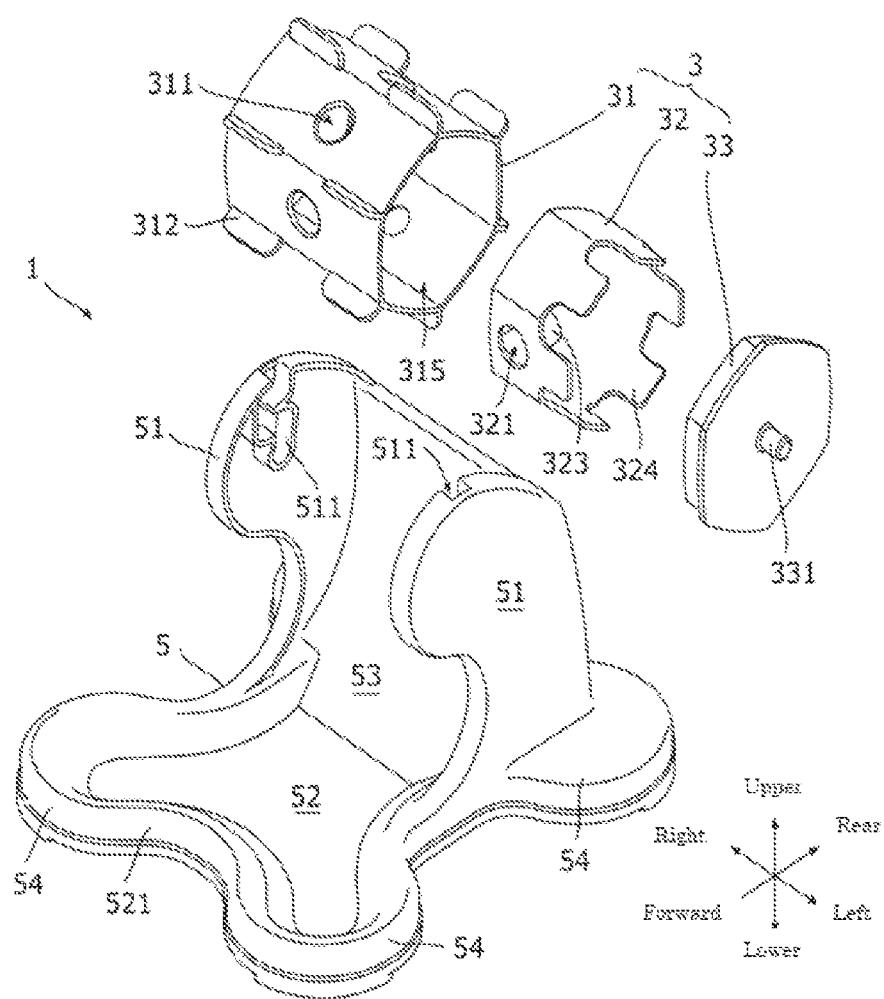
FIG. 2 is an exploded view of the feeding tool 1.

For example, as shown in FIG. 2, the stand 5 includes a supporting portion 51, a receiving portion 52, a slider 53, and an overturn prevention portion 54. The stand 5 can be produced as an integrally molded product of resin. Each component of the stand 5 will be described in detail below.

The supporting portion 51 rotatably supports the drum 3. The supporting portion 51 is a pair of opposing plates, and has a holding mechanism 511 for receiving the shafts 313 and 331 of the drum 3 on the inner surface side.

Figure 4A:
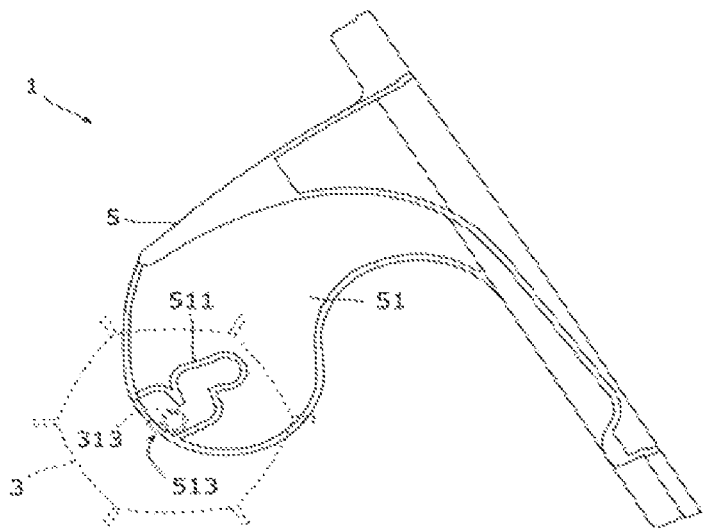
FIGS. 4(A) and 4(B) show diagrammatically the positional relationship between the supporting portion 51 of the stand 5 and the shaft 313 of the drum 3 when the feeding tool 1 is overturned.
Figure 4B:
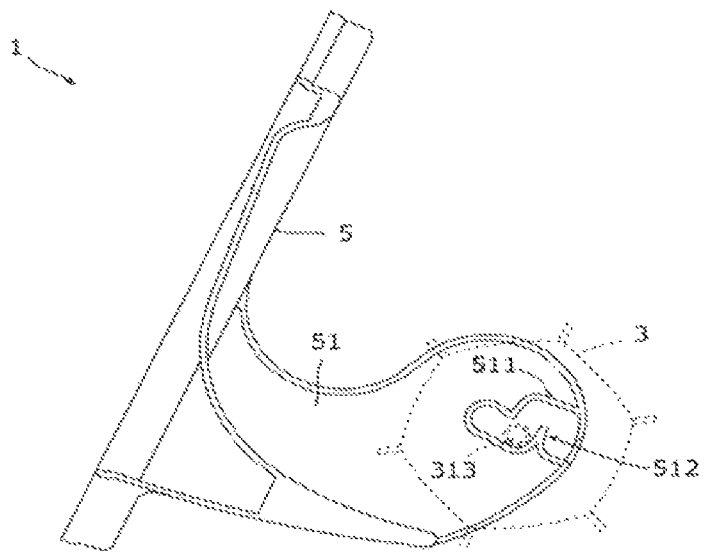

Here, the holding mechanism 511 is a groove that receives the shafts 313 and 331 and is bent in a substantially Ω shape. Namely, the holding mechanism 511 has contact portions 512 and 513 that prevent the shafts 313 and 331 from linearly moving. Specifically, the contact portion 512 comes into contact with the shafts 313 and 331 when the feeding tool 1 is overturned backward, and restricts the shafts 313 and 331 from falling off from the holding mechanism 511 (see FIG. 4(B)). Further, the contact portion 513 comes into contact with the shafts 313 and 331 when the feeding tool 1 overturned forward, and restricts the shafts 313 and 331 from falling off from the holding mechanism 511 (see FIG. 4(A)).

The receiving portion 52 is positioned below the drum 3 and receives the food F released from the drum 3. The receiving portion 52 extends forward from the base end (mounting surface side) of the supporting portion 51 and is connected to the lower end of the slider 53 (see FIG. 2).

The receiving portion 52 has a raised portion 521 that rises or protrudes from its edge. The raised portion 521 is a barrier for retaining the food F that has reached the receiving portion 52 within the receiving portion 52.

The front side of the raised portion 521 (that is, the portion facing the drum 3) is recessed toward the drum 3 side. Thereby, the distance between the pet and the drum 3 is shortened, and the pet can easily rotate the drum 3.

The slider 53 guides the food F released from the drum 3 to the receiving portion 52 between the supporting portions 51 consisting of a pair of plates. Namely, the slider 53 is a slope having an inclined surface extending from the rear of the drum 3 to the rear end of the receiving portion 52 (see FIGS. 2 and 3, for example). Alternatively, it may be said that the slider 53 is integrated by connecting the support portions 51 together. Therefore, the food F released from the drum 3 and collided with the slider 53 is guided to the receiving portion 52 along the slider 53.

The overturn prevention portion 54 protrudes outward along the mounting surface from the base end of the stand 5 (supporting portion 51) (see, for example, FIGS. 1(A) and (B)). Namely, the overturn prevention portion 54 prevents the overturn of the feeding tool 1 by extending away from the center of gravity of the feeding tool 1. In this embodiment, two overturn prevention portions 54 are provided left and right on the front side, and two are provided left and right on the rear side, and the two on the front side also serve as the receiving portions 52.

2. Method for Using the Feeding Tool

Next, a method for using the feeding tool 1 will be explained.

2-1. Method for Replenishing the Food

A method for replenishing the food F is explained.

First, the drum 3 is removed from the stand 5. Next, the lid 33 is removed from the main body 31 of the drum 3 (see FIG. 2), and the food F is put into the main body 31. At this time, the catching portion 32 may be left mounted inside the main body 31. Then, the lid 33 is fitted to the main body 31 and the drum 3 is set on the stand 5. In this way, replenishment of food is easy.

2-2. Selection of the Drum Holes

The adjustment or selection of the holes 311 of the drum 3 will be explained.

Figure 6B:
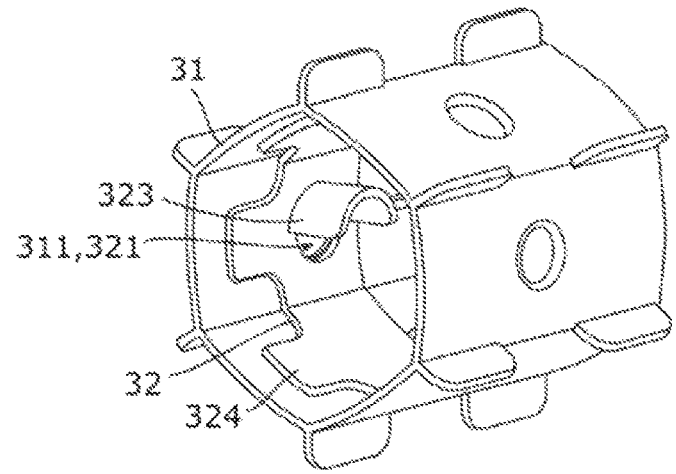

The drum 3 is removed from the stand 5, the lid 33 is removed from the main body 31, and further the catching portion 32 is removed from the main body 31. Next, the opening 321 of the catching portion 32 is aligned with the hole 311 to be set, and the catching portion 32 is inserted into the main body 31 (see FIG. 6(B)). At this time, the orientation of the catching portion 32 is determined so that the protruding piece 324 faces away from the main body 31 or toward the outside (see FIG. 6(A)). Thereby, only the hole 311 facing the opening 321 allows the outside and the inside of the drum 3 to communicate with each other, and the food F can be released. Then, the lid 33 is fitted to the main body 31 and the drum 3 is set on the stand 5.

Alternatively, if the catching portion 32 is inserted into the main body 31 of the drum 3 in the opposite direction (that is, so that the protruding piece 324 faces in the direction of the main body 31 side or inside), all the holes 311 of the drum 3 are closed (FIGS. 7(A), (B)). Therefore, by changing the orientation of the catching portion 32, it is possible to prevent the food F from coming out when not in use, for example.

2-3. How to Play the Feeding Tool

Previously replenishing the drum 3 with food F. Then, the food F in the drum 3 accumulates on the lower side of the drum 3 (see, for example, FIG. 5(A)).

When the pet touches the wings 312 of the drum 3 and rotates the drum 3 forward (that is, rotates forward), the concave surface of the catching piece 323 scoops the food F. The scooped food F moves along the inner surface of the drum 3 due to the centrifugal force of the drum 3 and weight, and is released from the hole 311 (see FIG. 5(B)). The released food F collides with the slider 53 and is guided along the slider 53 to the receiving portion 52. At this time, the food F is retained in the receiving portion 52 by the raised portion 521 having a convex shape upward from the ground surface. The pet eats the food F in the receiving portion 52.

3. Effects of the Present Embodiment

According to the present embodiment, the pet can rotate the drum 3 and eat the food F that comes out of the hole 311 of the drum 3. Therefore, it leads to the health of pets such as prevention of fast eating, prevention of obesity and diabetes, and reduction of gastrointestinal burden.

The pet goes through trial and error trying to eat food F. Then when the pet understands that the food F can be eaten by rotating the drum 3, the pet will rotate the drum 3 when hungry. Therefore, the feeding tool 1 can also be used for intellectual training of pets.

Alternatively, the pet may simply enjoy rotating the drum 3, or enjoy the appearance of the food F coming out. That is, the feeding tool 1 can also be used for pet entertainment.

Further, since the front edge of the receiving portion 52 is recessed toward the drum 3, the front legs of the pet can easily reach the drum 3, and therefore the pet can easily play with the feeding tool 1.

The pet may rotate the drum 3 vigorously. Even in such a situation, since the overturn prevention portion 54 prevents the feeding tool 1 from overturning in the forward, backward, leftward, and rightward directions, it is possible to use in safe. Even if the stand 5 is overturned, since the contact portions 512 and 513 are in contact with the shafts 313 and 331 of the drum 3 to restrict further movement of the shafts 313 and 331, the drum 3 is unlikely to come off from the stand 5 (FIGS. 4(A) and 4(B)).

The drum 3 can be easily set by simply dropping onto the stand 5.

In the above, the typical embodiments of the feeding tool of the present invention are explained, but, the present invention is not limited thereto, and can include various modifications within the scope of the present invention.

The invention claimed is:

1. A feeding tool comprising:
   a drum that stores a food and has holes on its peripheral surface,
   a supporting portion that rotatably supports the drum,
   a receiving portion located below the drum, and
   a slider that guides the food released from the hole of the drum to the receiving portion; and
   the food released from the hole as the drum rotates comes into contact with the slider and is guided to the receiving portion,
   wherein the drum has a catching portion that guides the food to the hole,
   wherein the catching portion includes an opening at a position corresponding to the hole of the drum,
   wherein the drum has wings that protrude outward from the peripheral surface, and
   wherein the wings are laterally positioned left and right of each of the holes in the circumferential direction of the drum.

2. The feeding tool according to claim 1, wherein the catching portion includes a catching piece that protrudes inward from a portion of the inner edge of the opening.

3. The feeding tool according to claim 1, further comprising an overturn prevention portion that protrudes outward along an installation surface from a base of the supporting portion.

4. The feeding tool according to claim 1, wherein, in the receiving portion, the front edge which faces the drum is recessed toward the drum.

5. The feeding tool according to claim 1, wherein the receiving portion has a raised portion which rises from the edge of the receiving portion.

* * * * *